(12) United States Patent
Ishida et al.

(10) Patent No.: US 8,678,965 B2
(45) Date of Patent: Mar. 25, 2014

(54) AUTO-TENSIONER

(75) Inventors: Tomokazu Ishida, Hyogo (JP); Ryosuke Dan, Hyogo (JP)

(73) Assignee: Mitsuboshi Belting Ltd., Kobe-shi (JP)

( * ) Notice: Subject to any disclaimer, the term of this patent is extended or adjusted under 35 U.S.C. 154(b) by 253 days.

(21) Appl. No.: 13/122,780

(22) PCT Filed: Oct. 9, 2009

(86) PCT No.: PCT/JP2009/067661
§ 371 (c)(1),
(2), (4) Date: Apr. 6, 2011

(87) PCT Pub. No.: WO2010/041747
PCT Pub. Date: Apr. 5, 2010

(65) Prior Publication Data
US 2011/0201466 A1     Aug. 18, 2011

(30) Foreign Application Priority Data

Oct. 10, 2008   (JP) .................................. 2008-263942
May 28, 2009   (JP) .................................. 2009-129041

(51) Int. Cl.
*F16H 7/08*     (2006.01)

(52) U.S. Cl.
USPC ........................................................ 474/113

(58) Field of Classification Search
USPC ......................................... 474/135, 112, 133
See application file for complete search history.

(56) References Cited

U.S. PATENT DOCUMENTS

| 4,473,362 A | 9/1984 | Thomey et al. |
| 5,632,697 A | 5/1997 | Serkh |
| 6,609,988 B1* | 8/2003 | Liu et al. ........................ 474/133 |
| 6,767,303 B2* | 7/2004 | Ayukawa ........................ 474/135 |
| 8,118,698 B2* | 2/2012 | Guhr .............................. 474/135 |
| 8,157,682 B2* | 4/2012 | Serkh ............................. 474/166 |
| 2005/0043131 A1* | 2/2005 | Asbeck et al. ................. 474/135 |
| 2010/0105508 A1* | 4/2010 | Mennerat et al. ............. 474/135 |

FOREIGN PATENT DOCUMENTS

| CN | 1575386 A | 2/2005 |
| CN | 1646826 A | 7/2005 |
| EP | 1640636 A2 | 3/2006 |
| JP | 62-002182 B | 1/1987 |
| JP | 7-83295 A | 3/1995 |

(Continued)

OTHER PUBLICATIONS

International Search Report for PCT/JP2009/067661 dated Jan. 12, 2010 [PCT/ISA/210].

(Continued)

*Primary Examiner* — William E Dondero
*Assistant Examiner* — Diem Tran
(74) *Attorney, Agent, or Firm* — Sughrue Mion, PLLC

(57) ABSTRACT

An automatic tensioner includes a base, a rotary member to which a pulley around which a belt is wound can be attached, a coil spring including one end locked on the base and the other end locked on the rotary member, an elastic element including one end locked on one of the rotary member and the base and the other end which is a free end and extending along an inner circumferential surface of the other of the rotary member and the base, and a friction member connected so as to be brought into contact with the inner circumferential surface, wherein the coil spring is disposed in such a state that the coil spring is compressed in an axial direction and the friction member is pressed against the one of the rotary member and the base by a repulsive force attempting to expand in an axial direction.

11 Claims, 7 Drawing Sheets

(56) References Cited

FOREIGN PATENT DOCUMENTS

| | | | |
|---|---|---|---|
| JP | 2003-254399 | A | 9/2003 |
| JP | 2004-270858 | A | 9/2004 |
| JP | 2006-097898 | A | 4/2006 |
| WO | WO 2012147957 | A1 * | 11/2012 |

OTHER PUBLICATIONS

Written Opinion for PCT/JP2009/067661 dated Jan. 12, 2010 [PCT/ISA/237].
Extended European Search Report issued on Mar. 19, 2012 in European Patent Application No. EP 09 81 9280.

* cited by examiner

BELT SLACKENING DIRECTION ←→ BELT TENSIONING DIRECTION

AUTO-TENSIONER

TECHNICAL FIELD

The present invention relates to an automatic tensioner which holds the tension of a belt as required.

BACKGROUND ART

Patent Document 1 (JP2006-097898) describes a belt tensioner in which a torsion coil spring, a spring strip and a damper sleeve are provided between a hub and an accommodation casing. In this belt tensioner, one end of the torsion coil spring abuts the accommodating casing and the other end abuts one end of the spring strip. The other end of the spring strip abuts a fixing portion formed on a lid which is firmly connected to the hub, and the damper sleeve is disposed between the spring strip and the accommodation casing. A preload is exerted on the torsion coil spring so as to expand the torsion coil spring in a radial direction, whereby the damper sleeve is pressed against an internal side of the accommodation casing by the radial expansion of the spring strip as a result of exertion of the preload. Then, a braking force is produced by increasing further the pressing force against the damper sleeve.

In addition, Patent Document 2 (JP62-002182B2) discloses a configuration in which a coil spring rotates so as to press a spring support against a boss portion of a rotary member with a predetermined pressing force, whereby a sliding friction is produced between the spring support and the boss portion to thereby attenuate the rotation of the rotary member.

However, in the belt tensioner described in Patent Document 1 above, since the damper sleeve is only simply held between the spring strip and the accommodation casing (a state in which the damper sleeve is fitted in the spring strip) by the radial expansion of the spring strip by the preload, incase the pressing force by the preload is not exerted on the damper sleeve at all times, the damper sleeve slides on an outer circumferential surface of the spring strip when a circumferential force is exerted on the damper sleeve. In addition, although the pressing force against the damper sleeve is adjusted properly by the preload, there is a situation in which the pressing force decreases as a result of the use for a long period of time. In this way, when the pressing force against the damper sleeve decreases, the damper sleeve tends to slide easily with respect to the circumferential direction to thereby reduce the braking force largely.

SUMMARY OF THE INVENTION

Then, an object of the invention is to provide an automatic tensioner which suppresses a reduction in braking force.

According an aspect of the invention, there is provided an automatic tensioner configured as below. Namely, there is provided an automatic tensioner including a base, a rotary member which is supported rotatably on the base and to which a pulley around which a belt is wound can be attached, a coil spring including one end locked on the base and the other end locked on the rotary member and adapted to bias the rotary member in one direction with respect to the base, an elastic element including one end locked on one of the rotary member and the base and the other end which is a free end and extending along an inner circumferential surface of the other of the rotary member and the base, and a friction member connected so as to be brought into contact with the inner circumferential surface of the other of the rotary member and the base and so as not to move in a circumferential direction relatively to the elastic element. Further, the coil spring is disposed in such a state that the coil spring is compressed in an axial direction, and the friction member is pressed against the one of the rotary member and the base by a repulsive force attempting to expand in an axial direction. Note that "locked" includes locked states such as a state in which two members abut each other to be fastened together, a state in which two members are caught on each other to be fastened together and a state in which two members abut each other to be fixed together by an adhesive or through welding.

The automatic tensioner may further be configured as below. Namely, the one end of the elastic element is held by the one of the rotary member and the base and the coil spring in the circumferential direction. Namely, since the rotary member and the coil spring are brought into strong engagement in the circumferential direction by the biasing of the rotary member in one direction by the coil spring, according to the configuration, the end portion of the elastic element can be locked on the rotary member in an ensured fashion without making the configuration complex.

The automatic tensioner may further be configured as below. Namely, a plurality of friction members like the friction member are provided so as to be spaced apart from each other along the extending direction of the elastic element. According to the configuration, when the elastic element expands by the rotation of the rotary member, the failure of the friction member can be suppressed which would otherwise be a case due to a difference between a tensile elastic modulus of the elastic element and a tensile elastic modulus of the friction member.

The automatic tensioner may further be configured as below. Namely, the friction member has an L-shaped section. A portion vertical to the axial direction receives the coil spring in the axial direction. On the other hand, a portion parallel to the axial direction receives the elastic element in the radial direction. A circumferential deviation of the friction member relative to the elastic element is prevented at a higher level by the modulated shape. In addition, since the surface area of the portion which receives the coil spring in the axial direction is easily secured, the degree of freedom in design on a braking effect between the base member and the rotary member is increased to a high level.

The automatic tensioner may further be configured as below. Namely, the elastic element and the friction member are locked together by meshing engagement of irregularities formed thereon. This configuration contributes to the prevention of circumferential deviation of the friction member relative to the elastic element.

The automatic tensioner may further be configured as below. Namely, the elastic element and the friction member are locked together through either adhesion by an adhesive or brazing. This configuration contributes to the prevention of circumferential deviation of the friction member relative to the elastic element.

The automatic tensioner may further be configured as below. Namely, the friction member is made of a synthetic resin, and the friction member and the elastic element are formed integrally. This configuration contributes to the prevention of circumferential deviation of the friction member relative to the elastic element.

The automatic tensioner may further be configured as below. Namely, the automatic tensioner includes further a coil spring support member which suppresses the inclination of a posture of the coil spring in proximity to the one end of the elastic element, and the coil spring support member is disposed between the friction member and the coil spring.

Namely, in realizing the stabilization of the posture of the coil spring in proximity to the one end of the elastic element, compared with a case where some means is devised at the one end of the elastic element to deal with the inclination of the posture of the coil spring, the configuration in which the coil spring support member is simply disposed between the friction member and the coil spring is useful from the viewpoints of life and degree of freedom in design in that an exact distribution of roles of the required functions is realized.

The automatic tensioner may further be configured as below. Namely, the coil spring support member is secured to the friction member. According to this configuration, when some load is exerted on the coil spring support member as a result of the coil spring being displaced or deformed, the load is transmitted to the friction member with good efficiency.

Consequently, the frictional force between the friction member and the base or the rotary member is increased.

The automatic tensioner may further be configured as below. Namely, based on an axis of the automatic tensioner, the coil spring support member is disposed in the same direction as a direction of a load that the end portion of the coil spring which abuts the one end of the elastic element receives from one of the rotary member and the base. According to this configuration, since the coil spring support member is configured so as to wait for an initial inclination of the posture of the coil spring occurring in proximity to the one end of the elastic element, the inclination of the posture of the coil spring occurring in proximity to the one end of the elastic element can be suppressed with good efficiency.

The automatic tensioner may further be configured as below. Namely, the coil spring support member is disposed within a range of 70° to 100° from the end portion of the coil spring where the coil spring support member abuts the one end of the elastic member. According to this configuration, since the coil spring support member is configured so as to wait for an initial inclination of the posture of the coil spring occurring in proximity to the one end of the elastic element, the inclination of the posture of the coil spring occurring in proximity to the one end of the elastic element can be suppressed with good efficiency.

Other forms and advantages of the invention become obvious from the following description, drawings and claims.

MODE FOR CARRYING OUT THE INVENTION (First Embodiment)

Figure 1:
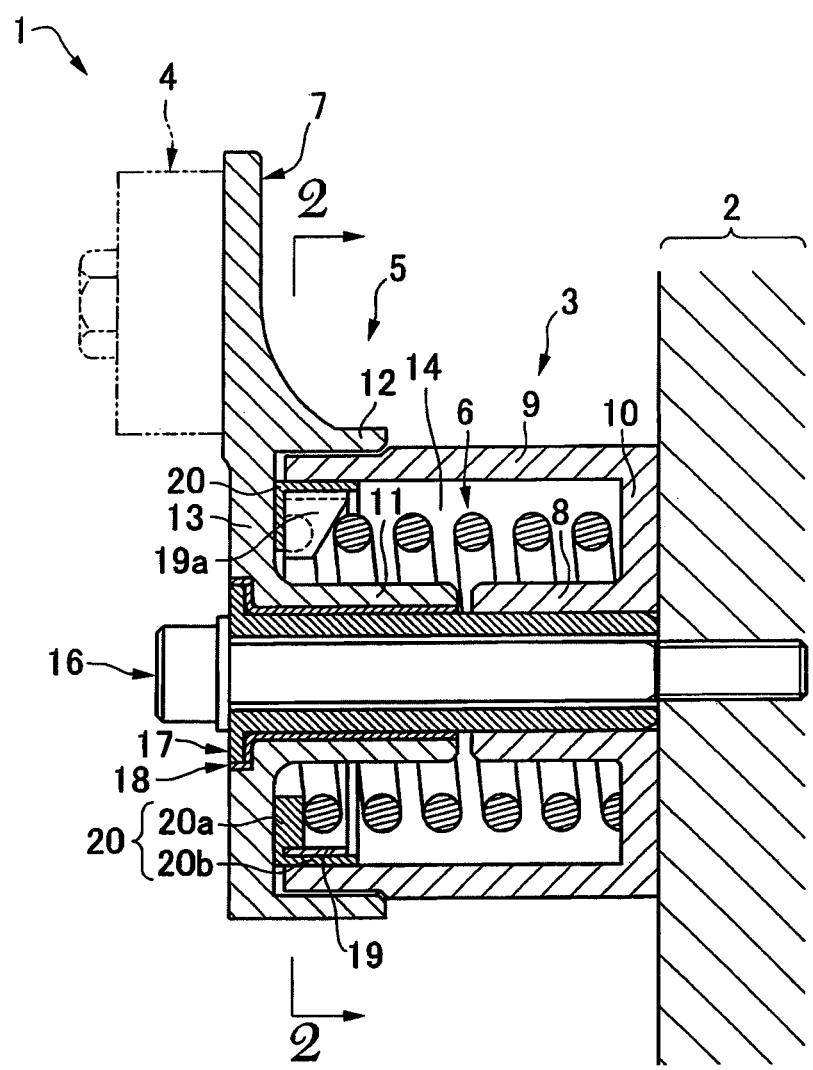
FIG. 1 is an elevational view in section of an automatic tensioner according to a first embodiment of the invention.
Figure 2:
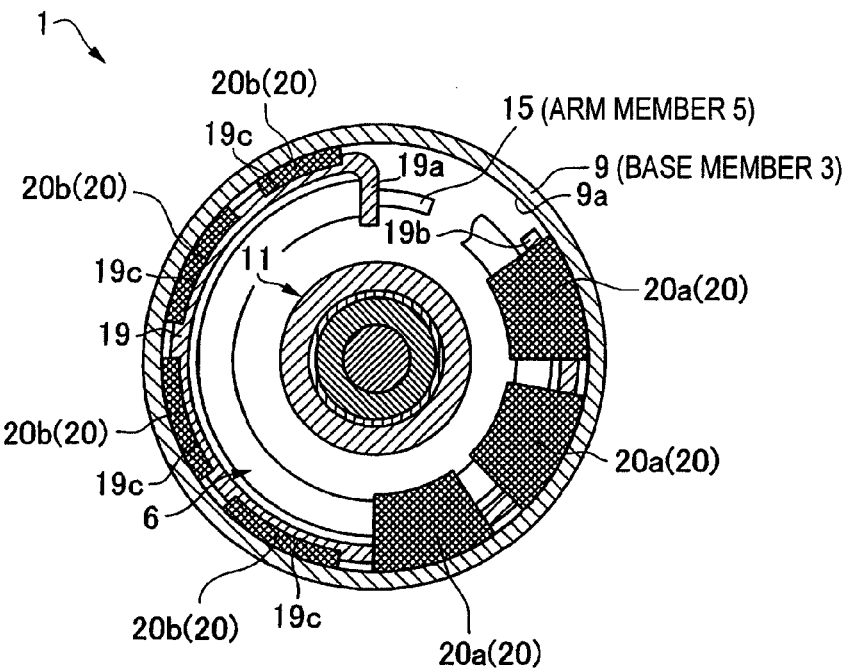
FIG. 2 is a sectional view taken along the line 2-2 and viewed in a direction indicated by arrows attached thereto in FIG. 1.
Figure 3:
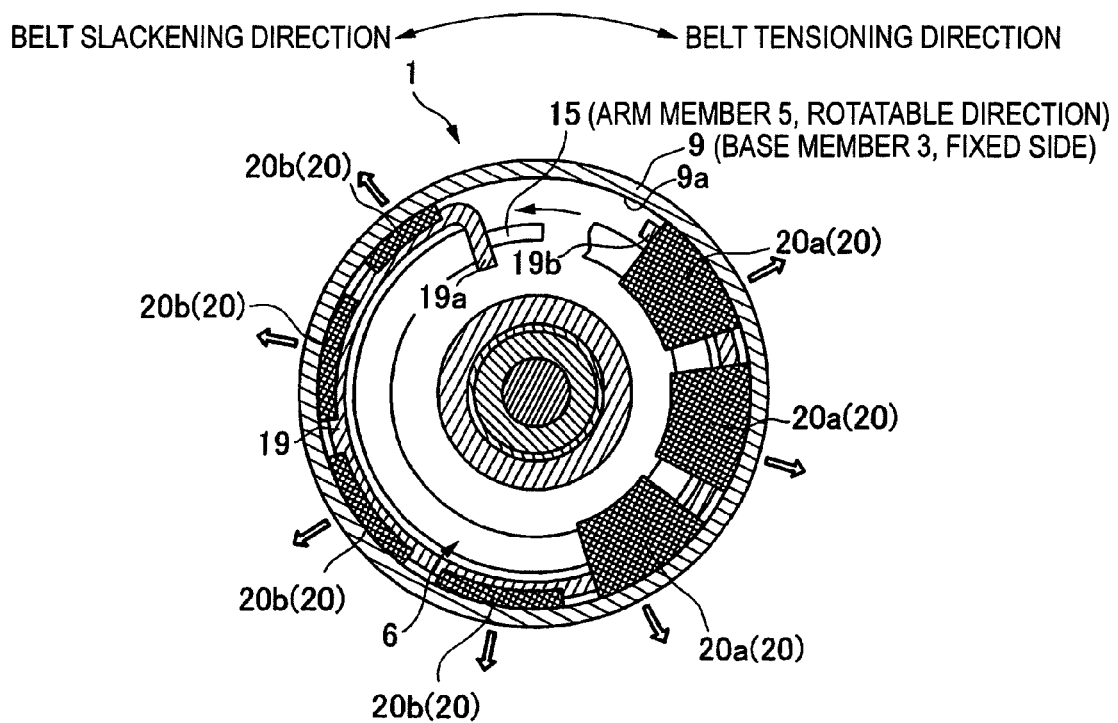
FIG. 3 is a drawing explaining the operation of the automatic tensioner according to the first embodiment.

Hereinafter, referring to FIGS. 1 and 2, the configuration of an automatic tensioner according to a first embodiment of the invention will be described in detail. Referring to FIGS. 1 to 3, the operation of the automatic tensioner 1 will be described. FIG. 1 is an elevational view in section of the automatic tensioner according to the first embodiment of the invention. FIG. 2 is a sectional view taken along the line 2-2 and viewed in a direction indicated by arrows attached thereto in FIG. 1. FIG. 3 is a drawing for explaining the operation of the automatic tensioner according to the first embodiment.

An automatic tensioner 1 shown in FIG. 1 is an apparatus for adjusting as required a tension of a transmission belt which transmits the power of a crankshaft of an engine to an auxiliary of the engine.

The automatic tensioner 1 includes a base member 3 (a base) fixed to an engine block 2, an arm member 5 (a rotary member) which is supported rotatably on the base member 3 and to which a pulley 4 around which a transmission belt, not shown, is wound can be attached, and a coil spring 6 which is locked on the base member 3 and the arm member 5 at both ends thereof so as to bias the arm member 5 in one direction relative to the base member 3. A biasing force by the coil spring 6 is converted into a tension to be given to the transmission belt via an arm of the arm member 5 and the pulley 4 which is attached rotatably to the arm 7.

Hereinafter, when used simply herein, an "axial direction" means a direction parallel to a rotational axis of the pulley 4.

The base member 3 includes a base inner cylinder 8, a base outer cylinder 9 which is larger in diameter than the base inner cylinder 8 and a doughnut shaped bottom wall 10 which connects the base inner cylinder 8 and the base outer cylinder 9. An axial length of the base outer cylinder 9 is larger than an axial length of the base inner cylinder 8.

The arm member includes a boss portion which is a cylindrical element which has substantially the same diameter as that of the base inner cylinder 8, an arm outer cylinder 12 which has a larger diameter than that of the boss portion 11, a doughnut shaped lid wall 13 which connects the boss portion 11 and the arm outer cylinder 12 and the arm 7 which extends further from the arm outer cylinder 12 to radially outwards.

In this configuration, the base inner cylinder 8 of the base member 3 and the boss portion 11 of the arm member 5 are disposed concentrically. Further, the base member 3 and the arm member 5 are combined together so that the arm outer cylinder 12 of the arm member 5 is placed over a distal end portion of the base outer cylinder 9 of the base member 3 from an outer circumference side, whereby a spring accommodation space 14 for accommodating therein the coil spring 6 is defined. This spring accommodation space 14 is defined by the base inner cylinder 8, the bottom wall 10 and the base inner cylinder 9 of the base member 3 and the arm outer cylinder 12, the lid wall 13 and the boss portion 11 of the arm member 5.

The coil spring 6, which is accommodated in this spring accommodation space 14, is locked on locked on the base 3 at one end and is locked on the arm member 5 at the other end to thereby bias the arm member 5 in one direction relative to the base member 3. When used herein, the "one direction" means a direction in which a tension is given to the transmission belt which is wound around the pulley 4.

The coil spring 6 is locked on the base member 3 by a known method. For example, the known method is a method in which an end portion of the coil spring 6 is securely fitted in a groove portion formed in the base member 3 or a method in which a bent end portion of the coil spring 6 is press fitted in a locking hole which is formed in the base member 3 so as to extend in a radial direction or an axial direction.

On the other hand, in this embodiment, an end portion of the coil spring 6 is locked by a locking projection 15 (refer to FIG. 2) which extends from the lid wall 13 towards the bottom wall 10 and abuts the end portion of the coil spring 6 in a circumferential direction. The locking of the end portion of the coil spring 6 on the arm member 5 will be descried later in detail.

The base member 13 and the arm member 5 are supported on the engine block 2 by use of a bolt 16. To be specific, a bolt 16 is passed through the base inner cylinder 8 o the base member 3 and the boss portion 11 of the arm member 5, and a leading end of this bolt 16 is screwed into the engine block 2, whereby the base member 3 and the arm member 5 are supported on the engine block 2. When the bolt 16 is so screwed into the engine block 2, the coil spring 6 accommodated in the spring accommodation space 14 is put in a state in which the coil spring 6 is compressed in the axial direction.

Thus, the basic configuration of the automatic tensioner has been described. Next, referring to FIG. 2, a plate spring (an elastic element) and a friction member 20 will be described in detail.

In this embodiment, in addition to the coil spring 6, the plate spring 19 and a plurality of friction members 20 are accommodated in the spring accommodation space 14.

The plate spring 19 is a thin plate spring which extends in an arc-like fashion along an inner circumferential surface of the outer cylinder 9 of the base member 3.

A first end portion 19a of the plate spring 19 is bent radially inwards at 90 degrees and is locked on the arm member 5. To be in detail, this first end portion 19a is strongly held by the locking projection 15 of the arm member 5 and the coil spring 6 in a circumferential direction, whereby the first end portion 19a is locked on the locking projection 15 of the arm member 5.

On the other hand, a second end portion 19b of the plate spring 19 is made into a free end. Namely, the second end portion 19b of the plate spring 19 is locked on neither the base member 3 nor the arm member 5. In addition, the extending direction of the plate spring 19 based on the first end portion 19a coincides with a direction in which the coil spring 6 moves away from the locking projection 15 of the arm member 5. In this embodiment, a length over which the plate spring 19 extends is generally ⅞ of the full circumference of the inner circumferential surface of the outer ring 9.

The plurality of friction members 20 are connected to the plate spring 19 at equal intervals so as to be brought into contact with the inner circumferential surface 9a of the base outer cylinder 9 of the base member 3 and so as not to move in the circumferential direction relative to the inner circumferential surface 9a. As is shown in FIG. 1, each friction member 20 has an L-shaped section. A coil spring receiving portion 20a which is vertical to the axial direction is disposed so as to be held in the axial direction by the coil spring 6 and the lid wall 13. Consequently, the coil spring receiving portion 20a receives in the axial direction a self elastic axial expansion force (a repulsive force) of the coil spring 6 accommodated in the spring accommodation chamber 14 in a compressed state to thereby be pressed against the lid wall 13 of the arm member 5.

On the other hand, the plate spring receiving portion 20b which is parallel to the axial direction is, as is shown in FIG. 2, disposed so as to be held by the base outer cylinder 9 of the base member 3 and the plate spring 19 in the radial direction. Consequently, the plate receiving portion 20b receives in the radial direction a self elastic radial expansion force of the plate spring 19 which is accommodated in the spring accommodation space 14 in a slightly radially compressed state. The plurality of friction members 20 are in contact with the inner circumferential surface 9a of the base outer cylinder 9 of the base member 3 at all times by the self elastic radial expansion force.

In addition, the plurality of friction members 20 are formed integrally with the plate spring 19. To be in detail, the plate spring receiving portion 20b of each friction member 20 is partially accommodated in a recess 19c formed in an outer circumferential surface of the plate spring 19, whereby strong integrality between the friction member 20 and the plate spring 19 is realized. In this embodiment, the friction members 20 are formed of a synthetic resin which contains mainly a nylon resin. However, in place of this synthetic resin, the friction members 20 may be made of a synthetic resin which contains mainly a polyacetal resin or a polyarylate, and any kind of material can be used, provided that the material can be formed integrally with the plate spring 19. Consequently, the friction members 20 may be made of brass, plated brass, bronze or plated bronze.

In a steady state during the operation of the automatic tensioner 1, the coil spring receiving portion 20a of each friction member 20 changes its thickness slightly so as to just fill a gap between the coil spring 6 and the lid wall 13. To be specific, in FIG. 2, the coil spring receiving portions 20a of the friction members 20 become gradually thicker as they are disposed farther away from the first end portion 19a of the plate spring 19. Consequently, the self elastic axial expansion force is exerted uniformly on the coil spring receiving portions 20a of the friction members 20, whereby an eccentric wear of the friction members 20 is prevented.

Next, the operation of the embodiment will be described.

Firstly, a stationary state of the automatic tensioner 1 when the transmission belt is not driven will be described. In a stationary state shown in FIGS. 1 and 2, the coil spring receiving portion 20a of each friction member 20 receives the self elastic axial expansion force of the coil spring 6 in the axial direction to thereby be pressed against the lid wall 13 of the arm member 5. Namely, the coil spring receiving portion 20a is held by the lid wall 13 of the arm member 5 and the coil spring 6 in the axial direction, thereby making it possible to prevent the play of each friction member 20 by the plate spring 19.

In addition, the plate spring receiving portion 20b of each friction member 20 receives the self elastic radial expansion force of the plate spring 19 to thereby be pressed from the base outer cylinder 9 of the base member 3. Namely, the plate spring receiving portion 20b is held in the radial direction by the base outer cylinder 9 of the base member 3 and the plate spring 19 to thereby prevent the play of each friction member 20 by the plate spring 19.

Next, an operating state will be described in which the transmission belt is driven and the automatic tensioner 1 is adjusting the tension of the transmission belt. Firstly, when the transmission belt slackens for some reason, a balance between a twisting restoring force of the coil spring 6 and the tension of the transmission belt exerted on the locking projection 15 of the arm member 5 is lost, and the locking projection 15 of the arm member 5 moves in a clockwise direction in FIG. 2, whereby the balanced state is restored. As this occurs, the first end portion 19a of the plate spring 19 which is locked on the locking projection 15 of the arm member 5 also moves in the clockwise direction in FIG. 2. As this occurs, since the plate spring 19, whose second end portion 19b is made into the free end, is deformed into a slightly diametrically contracted state, a frictional torque exerted between the locking projection 15 of the arm member 5 and the base outer cylinder 9 of the base member 3 is small.

According to pages 135 to 138 of the "Spring" whose first edition was first printed on Feb. 15, 1995 by Kogyo Chosakai Publishing Co., Ltd, the frictional torque can be expressed by the following expression (1). However, in the following expression (1), T1 denotes the frictional torque above, w a force with which the locking projection 15 of the arm member 5 presses the plate spring first end portion 19a of the plate spring 19, r a radius of the plate spring 19, µ a kinetic friction coefficient between the base outer cylinder 9 of the base member 3 and the friction member 20, β a total sum of circumferential lengths of outer circumferences of the friction members 20, and P a torque accompanying an initial tension of the coil spring.

[Expression 1]

$$T_1 = wr \cdot (e^{\alpha\beta} - 1)/e^{\alpha\beta} + \mu Pr \quad (1)$$

On the other hand, when the transmission belt is over tensioned for some reason, a balance between a twisting restoring force of the coil spring 6 and the tension of the transmission belt exerted on the locking projection 15 of the arm member 5 is lost, and the locking projection 15 of the arm member 5 moves in a counterclockwise direction in FIG. 2, whereby the balanced state is restored. As this occurs, the first end portion 19a of the plate spring 19 which is locked on the locking projection 15 of the arm member 5 also moves in the counterclockwise direction in FIG. 2. As this occurs, since the plate spring 19, whose second end portion 19b is made into the free end, is deformed into a slightly diametrically expanded state, a frictional torque exerted between the locking projection 15 of the arm member 5 and the base outer cylinder 9 of the base member 3 is large. Arrows outlined with thick black solid lines in FIG. 3 show surface contact pressures which are produced between the inner circumferential surface 9a of the base outer cylinder 9 and the friction members 20 by the diametrically expanded deformation. This frictional torque can also be similarly expressed by the following expression (2).

$$T_1 = wr \cdot (e^{\alpha\beta} - 1) + \mu Pr \quad (2)$$

In this way, in the automatic tensioner 1 according to the embodiment, a so-called asymmetric damping is realized in which frictional forces (frictional torques) that are generated between the friction members 20 and the base member 3 are made different between when the arm member 5 rotates in a direction in which the belt becomes taut and when the arm member 5 rotates in a direction in which the belt becomes slack.

As has been described, according to the embodiment, since the circumferential deviation of the friction members 20 relative to the plate spring 19 is prevented by locking the friction members 20 on the plate spring 19 so as not to move relative to the plate spring 19 in the circumferential direction, a reduction in braking force attributed to the deviation can be suppressed.

In addition, since the friction members 20 are pressed against the arm member 5 by the self elastic axial force (the repulsive force) with which the coil spring 6 attempts to extend in the axial direction, the placement of the plate spring 19 with respect to the arm member 5 becomes stable, whereby eccentric wear of the friction members 20 is suppressed.

Further, since the second end portion 19b of the plate spring 19 is made into the free end and the friction members 20 are provided so as to be brought into contact with the inner circumferential surface 9a of the base outer cylinder 9 of the base member 3, the so-called asymmetric damping is realized in which frictional forces that are generated between the friction members 20 and the base member 3 are made different between when the arm member 5 rotates in the direction in which the belt becomes taut and when the arm member 5 rotates in the direction in which the belt becomes slack.

In addition, the first end portion 19a of the plate spring 19 is held by the arm member 5 and the coil spring 6 therebetween in the circumferential direction. Namely, the arm member 5 and the coil spring 6 engage with each other strongly in the circumferential direction by being biased in the "one direction." According to this configuration, the first end portion 19a of the plate spring 19 can be locked in an ensured fashion without making the configuration complex.

In addition, the plurality of friction members 20 are provided along the extending direction of the plate spring 19 so as to be spaced apart from each other. According to this configuration, when the plate spring 19 is expanded by the rotation of the arm member 5, the failure of the friction members 20 can be suppressed which would otherwise be a case due to a difference in tensile elastic modulus between the plate spring and the friction members 20.

In addition, the friction member 20 has the L-shaped section. The coil spring receiving portion 20a which is vertical to the axial direction receives the coil spring 6 in the axial direction. The plate spring receiving portion 20b which is parallel to the axial direction receives the plate spring 19 in the radial direction. According to this configuration, the circumferential deviation of the friction member 20 relative to the plate spring 19 is prevented at a higher level. In addition, since the surface area of the coil spring receiving portion 20a which receives the coil spring 6 in the axial direction is easily secured by the L-shape, the degree of freedom in design on a braking effect between the base member 3 and the arm member 5 is increased to a high level.

In addition, the friction members 20 are made of the synthetic resin, and the friction members 20 and the plate spring 19 are formed integrally. This configuration contributes to the prevention of circumferential deviation of the friction member 20 relative to the plate spring 19.

(Second Embodiment)

Figure 4:
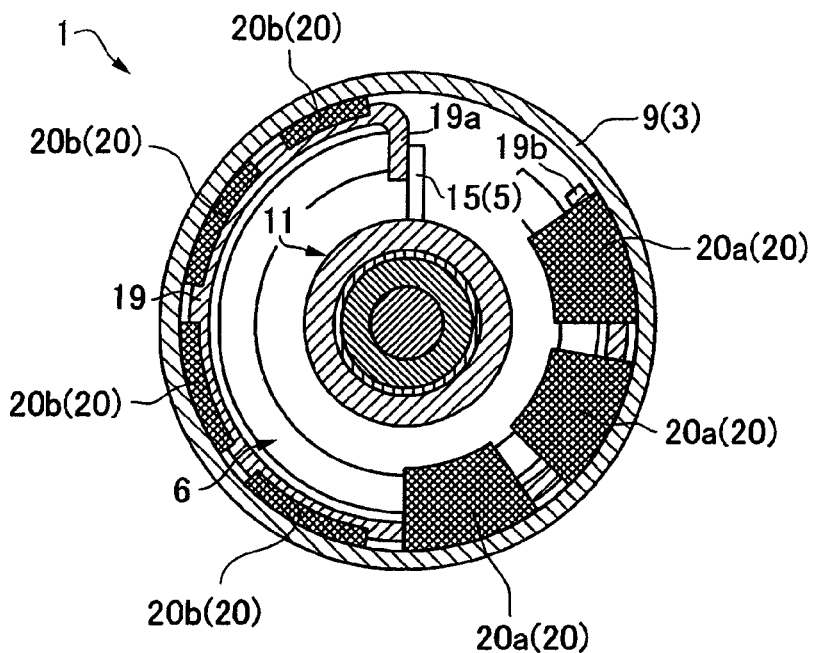
FIG. 4 is a sectional view showing a second embodiment of the invention.

Next, referring to FIG. 4, the configuration of an automatic tensioner 1 according to a second embodiment of the invention will be described. FIG. 4 is a sectional view showing the second embodiment of the invention. Hereinafter, those features in which this embodiment differs from the first embodiment will mainly be described, and those features which are similar to the features of the first embodiment will be omitted here as required.

The locking projection 15 of the arm member 5 according to the first embodiment is provided so as to project from the lid wall 13 of the arm member 5 towards the bottom wall 10 shown in FIG. 1. In contrast with this, a locking projection 15 of an arm member 5 according to this embodiment is provided so as to project from the boss portion 11 of the arm member 5 towards the arm outer cylinder 12 shown in FIG. 1 as is shown in FIG. 4.

(Third Embodiment)

Figure 5:
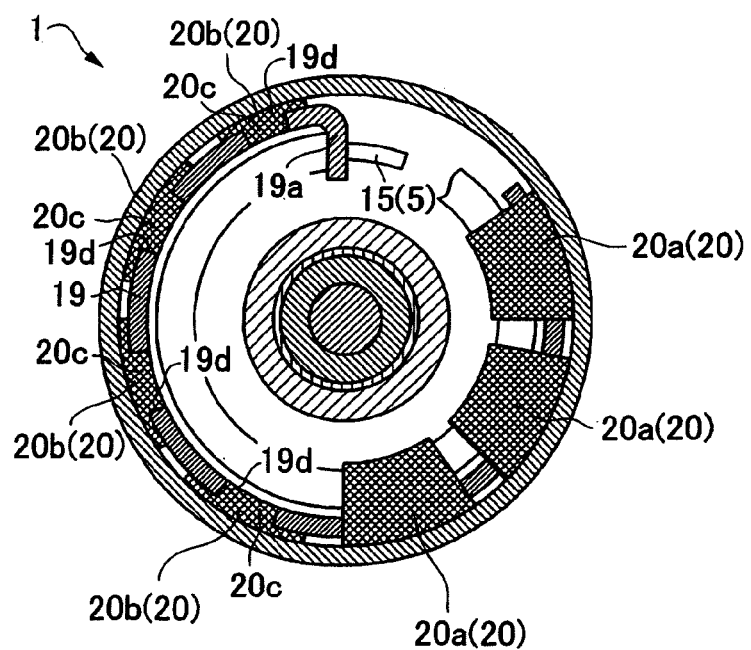
FIG. 5 is a sectional view showing a third embodiment of the invention.

Next, referring to FIG. 5, the configuration of an automatic tensioner 1 according to a third embodiment of the invention will be described. FIG. 5 is a sectional view showing the third embodiment of the invention. Hereinafter, those features in which this embodiment differs from the first embodiment will mainly be described, and those features which are similar to the features of the first embodiment will be omitted here as required.

In the first embodiment, the plate spring receiving portion 20b of each friction member 20 is partially accommodated in the recess 19c formed in the outer circumferential surface of the plate spring 19. In contrast with this, in this embodiment, a through hole ld is formed in place of the recess 19c.

On the other hand, a projecting portion 20c, adapted to fit in the through hole 19d, is formed on each friction member 20. Thus, the irregularities formed on a plate spring 19 and the friction members 20 are brought into meshing engagement with each other so that the projecting portions 20c formed on the friction members 20 fit in the through holes 19d formed in the plate spring 19, whereby the plate spring 19 and the friction members 20 are connected together strongly and rigidly in a circumferential direction. The meshing engagement of the irregularities contributes to the prevention of circumferential deviation of the friction members 20 relative to the plate spring 19.

(Fourth Embodiment)

Figure 6:
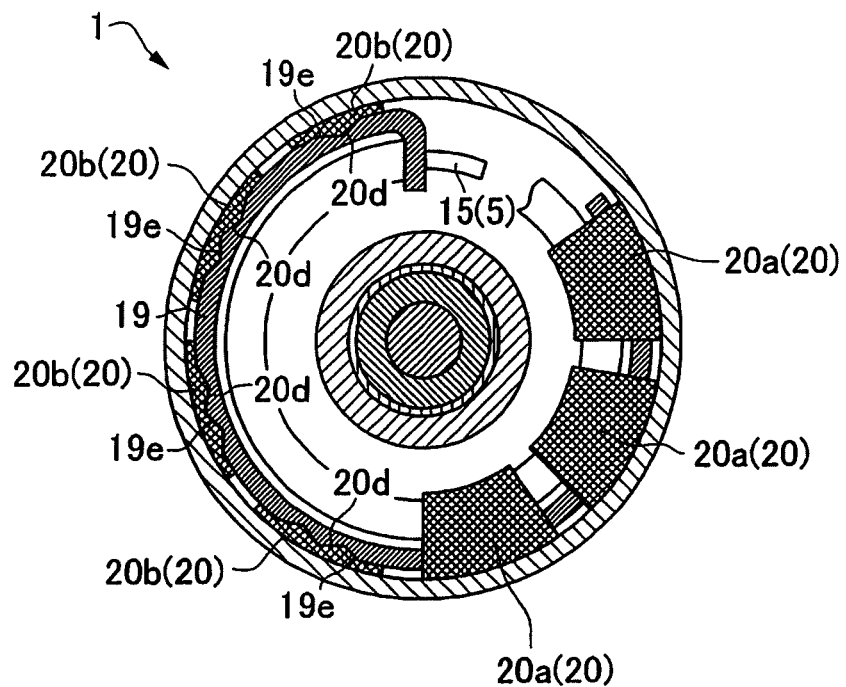
FIG. 6 is a sectional view showing a fourth embodiment of the invention.

Next, referring to FIG. 6, the configuration of an automatic tensioner 1 according to a fourth embodiment of the invention will be described. FIG. 6 is an elevational view showing the fourth embodiment of the invention. Hereinafter, those features in which this embodiment differs from the first embodiment will mainly be described, and those features which are similar to the features of the first embodiment will be omitted here as required.

In this embodiment, saw blade shaped serrated portions 19e are formed on a plate spring 19 in place of the recesses 19c above. On the other hand, serrated portions 20d are formed on each friction member 20 so as to be brought into meshing engagement with the serrated portion 19e without any gap left therebetween. Thus, the irregularities formed on the plate spring 19 and the friction members 20 are brought into meshing engagement with each other so that the serrated portions 20d formed on the friction members 20 mesh with the serrated portions 19e formed on the plate spring 19, whereby the plate spring 19 and the friction members 20 are connected together strongly and rigidly in a circumferential direction. The meshing engagement of the irregularities contributes to the prevention of circumferential deviation of the friction members 20 relative to the plate spring 19.

(Fifth Embodiment)

Figure 7:
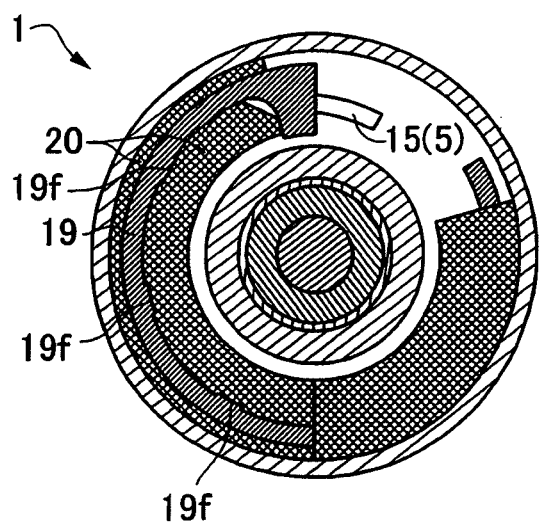
FIG. 7 is a sectional view showing a fifth embodiment of the invention.

Next, referring to FIG. 7, the configuration of an automatic tensioner 1 according to a fifth embodiment of the invention will be described. FIG. 7 is a sectional view showing the fifth embodiment of the invention. Hereinafter, those features in which this embodiment differs from the first embodiment will mainly be described, and those features which are similar to the features of the first embodiment will be omitted here as required.

In the first embodiment, the plurality of friction members 20 are arranged at the predetermined intervals along the extending direction of the plate spring 19. In contrast with this, in this embodiment, as is shown in FIG. 7, friction members 20 extend similarly in an arc-like shape along a direction in which a plate spring 19 extends.

In this embodiment, a plurality of small projections 19f are formed on an inner circumferential surface of the plate spring 19. The friction members 20 are shaped so as to hold the plate spring 19 therebetween in a radial direction while engaging with the plurality of small projections 19f. Namely, the plate spring 19 and the friction members 20 are connected together strongly and rigidly through meshing engagement by making use of the small projections 19f and the relationship in which the plate spring 19 is held by the friction members 20 in the radial direction. It is preferable that the tensile elastic modulus of the spring plate 19 and the tensile elastic modulus of the friction members 20 take values which are as close as possible. According to this configuration, a failure of the friction members 20 can be avoided which would otherwise be a case due to a difference in tensile elastic modulus from the plate spring 19.

(Sixth Embodiment)

Figure 8:
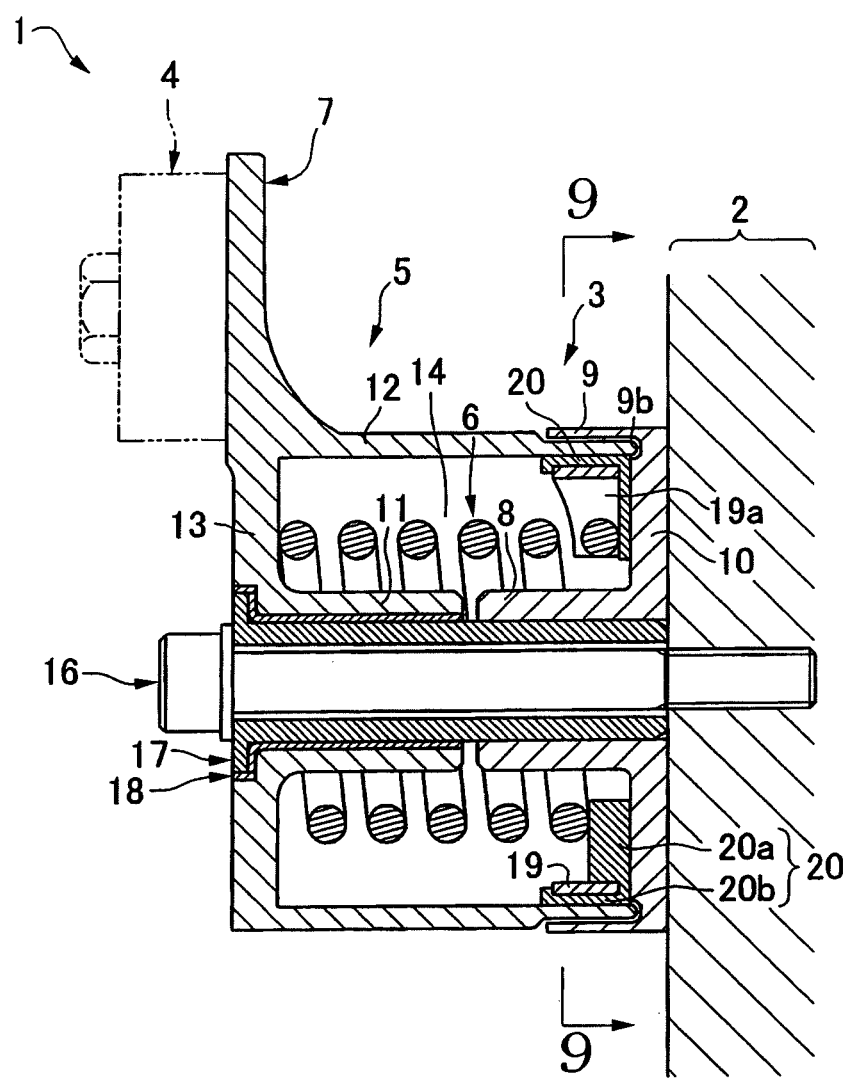
FIG. 8 is an elevational view in section of an automatic tensioner according to a sixth embodiment of the invention.
Figure 9:
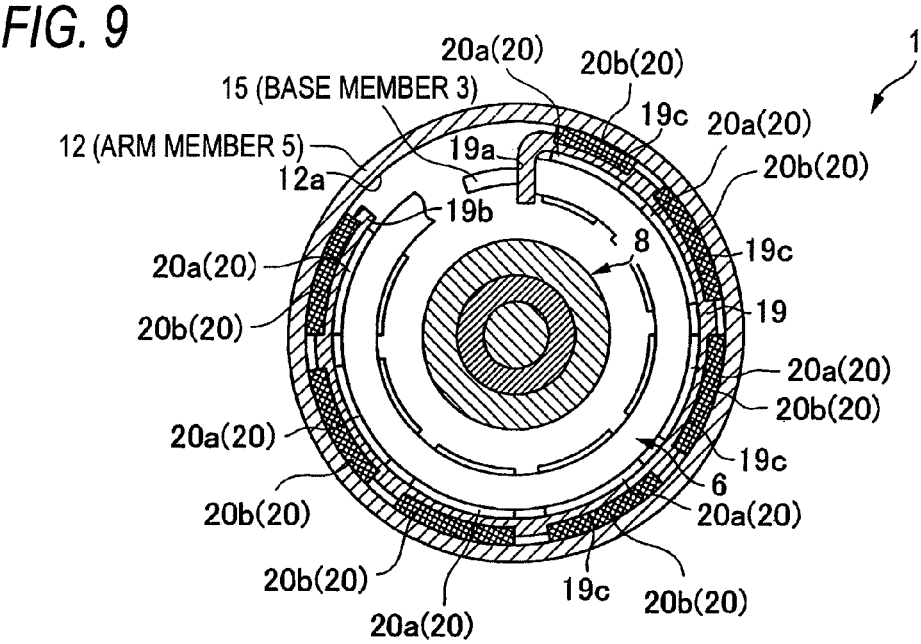
FIG. 9 is a sectional view taken along the line 9-9 and viewed in a direction indicated by arrows attached thereto in FIG. 8.
Figure 10:
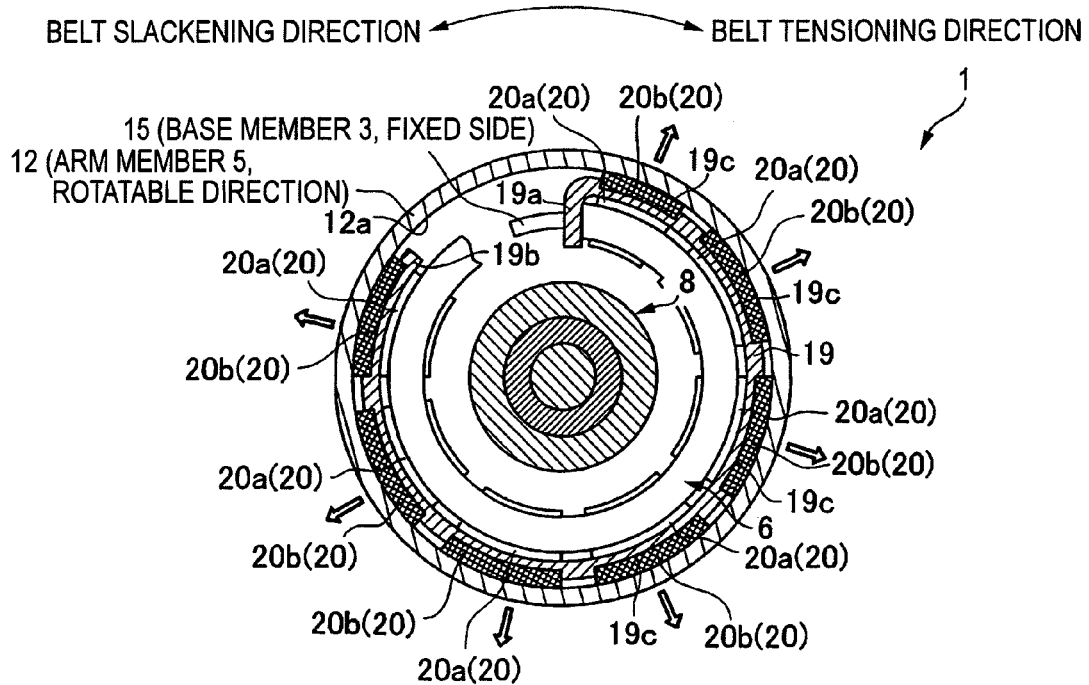
FIG. 10 is a drawing explaining the operation of the automatic tensioner according to the sixth embodiment.

Next, referring to FIGS. 8 to 10, the configuration of an automatic tensioner according to a sixth embodiment of the invention will be described. Referring to FIGS. 8 to 10, the operation of the automatic tensioner 1 will be described. FIG. 8 is an elevational view in section of the automatic tensioner according to the sixth embodiment of the invention. FIG. 9 is a sectional view taken along the line 9-9 and viewed in a direction indicated by arrows attached thereto in FIG. 8. FIG. 10 is an elevational view for explaining the operation of the automatic tensioner according to the sixth embodiment.

Hereinafter, those features in which this embodiment differs from the first embodiment will mainly be described, and those features which are similar to the features of the first embodiment will be omitted here as required.

In the first embodiment, the base outer cylinder 9 of the base member 3 extends so as to overlap the base inner cylinder 8 and the boss portion 11. In this embodiment, however, in place of a base outer cylinder 9 of a base member 3, an arm outer cylinder 12 of an arm member 5 extends so as to overlap a base inner cylinder 8 and a boss portion 11.

In addition, in the first embodiment, the base member 3 and the arm member 5 are combined together so that the arm outer cylinder 12 of the arm member 5 is placed on the leading end portion of the base outer cylinder 9 of the base member 3 from the outer circumferential side. On the other hand, in this embodiment, a groove 9b, in which a distal end of the arm outer cylinder 12 of the arm member 5 is accommodated, is formed at a connecting portion between abase outer cylinder 9 and a bottom wall 10 of a base member 3, and the base member 3 and the arm member 5 are combined together so that the base outer cylinder 9 of the base member 3 is placed on a leading end portion of the arm outer cylinder 12 of the arm member 5 from an outer circumferential side.

Consequently, a spring accommodation space 14 is defined by the base inner cylinder 8 and the bottom wall 10 of the base member 3 and the arm outer cylinder 12 a lid wall 13 and a boss portion 11 of the arm member 5.

A coil spring 6, which is accommodated in this spring accommodation space 14, is locked on the base member 3 at one end and is locked on the arm member 5 at the other end thereof to thereby bias the arm member 5 in one direction relative to the base member 3. The coil spring 6 is locked on the arm member 5 by a known method. For example, the known method is a method in which an end portion of the coil spring 6 is securely fitted in a groove portion formed in the arm member 5 or a method in which a bent end portion of the coil spring 6 is press fitted in a locking hole which is formed in the arm member 5 so as to extend in a radial direction or an axial direction.

On the other hand, in this embodiment, an end portion of the coil spring 6 is locked on the base member 3 by a locking projection 15 (refer to FIG. 9) which extends from a bottom wall 10 towards a lid wall 13 and abuts the end portion of the coil spring 6 in a circumferential direction. The locking of the end portion of the coil spring 6 on the base member 3 will be descried in detail later.

Next, referring to FIG. 9, a plate spring 19 (an elastic element) and friction members 20 will be described in detail.

The plate spring 19 is a thin plate spring which extends in an arc-like fashion along an inner circumferential surface of the arm outer cylinder 12 of the arm member 5. To be in detail, the plate spring 19 extends in the arc-like fashion along the inner circumferential surface 12a of the arm outer cylinder 12 of the arm member 5.

A first end portion 19a of the plate spring 19 is bent radially inwards at 90 degrees and is locked on the base member 3. To be in detail, this first end portion 19a is strongly held by the locking projection 15 of the base member 3 and the coil spring 6 in a circumferential direction, whereby the first end portion 19a is locked on the locking projection 15 of the base member 3.

On the other hand, a second end portion 19b of the plate spring 19 is made into a free end. Namely, the second end portion 19b of the plate spring 19 is locked on neither the base member 3 nor the arm member 5. In addition, the extending direction of the plate spring 19 based on the first end portion 19a coincides with a direction in which the coil spring 6 moves away from the locking projection 15 of the base member 3. In this embodiment, a length over which the plate spring 19 extends is generally ⅞ of the full circumference of the inner circumferential surface of the arm outer ring 12.

The plurality of friction members 20 are connected to this plate spring 19 at equal intervals so as to be brought into contact with the inner circumferential surface 12a of the arm outer cylinder 12 of the arm member 5 and so as not to move in the circumferential direction relative to the inner circumferential surface 12a. As is shown in FIG. 8, each friction member 20 has an L-shaped section. A coil spring receiving portion 20a which is vertical to the axial direction is disposed so as to be held in the axial direction by the coil spring 6 and the bottom wall 10. Consequently, the coil spring receiving portion 20a receives in the axial direction a self elastic axial expansion force (a repulsive force) of the coil spring 6 which is accommodated in the spring accommodation chamber 14 so as to be compressed in the axial direction to thereby be pressed against the bottom wall 10 of the base member 3.

On the other hand, the plate spring receiving portion 20b which is parallel to the axial direction is, as is shown in FIG. 9, is disposed so as to be held by the arm outer cylinder 12 of the arm member 5 and the plate spring 19 in the radial direction. Consequently, the plate receiving portion 20b receives in the radial direction a self elastic radial expansion force of the plate spring 19 which is accommodated in the spring accommodation space 14 in a slightly radially compressed state.

The plurality of friction members 20 are in contact with the inner circumferential surface 12a of the arm outer cylinder 12 of the arm member 5 at all times by the presence of the self elastic radial expansion force.

In a steady state during the operation of the automatic tensioner 1, the coil spring receiving portion 20a of each friction member 20 changes its thickness slightly so as to just fill a gap between the coil spring 6 and the bottom wall 10. To be specific, in FIG. 9, the coil spring receiving portions 20a of the friction members 20 become gradually thicker as they are disposed farther away from the first end portion 19a of the plate spring 19. Consequently, the self elastic axial expansion force is exerted uniformly on the coil spring receiving portions 20a of the friction members 20, whereby an eccentric wear of the friction members 20 is prevented.

Next, the operation of the embodiment will be described.

Firstly, a stationary state of the automatic tensioner 1 when the transmission belt is not driven will be described. In a stationary state shown in FIGS. 8 and 9, the coil spring receiving portion 20a of each friction member 20 receives the self elastic axial expansion force of the coil spring 6 in the axial direction to thereby be pressed against the bottom wall 10 of the base member 3. Namely, the coil spring receiving portion 20a is held by the bottom wall 10 of the base member 3 and the coil spring 6 in the axial direction, thereby making it possible to prevent the play of each friction member 20 by the plate spring 19.

In addition, the plate spring receiving portion 20b of each friction member 20 receives the self elastic radial expansion force of the plate spring 19 to thereby be pressed from the arm outer cylinder 12 of the arm member 5. Namely, the plate spring receiving portion 20b is held in the radial direction by the arm outer cylinder 12 of the arm member 5 and the plate spring 19 to thereby prevent the play of each friction member 20 by the plate spring 19.

Next, an operating state will be described in which the transmission belt is driven and the automatic tensioner 1 is adjusting the tension of the transmission belt. Firstly, when the transmission belt slackens for some reason, a balance between a twisting restoring force of the coil spring 6 and the tension of the transmission belt exerted on the arm member 5 is lost, and the arm outer cylinder 12 of the arm member 5 moves in a clockwise direction in FIG. 9, whereby the balanced state is restored. As this occurs, since the plate spring 19, whose second end portion 19b is made into the free end, is deformed into a slightly diametrically contracted state, a frictional torque exerted between the locking projection 15 of the base member 3 and the arm outer cylinder 12 of the are member 5 is small.

On the other hand, when the transmission belt is over tensioned for some reason, a balance between a twisting restoring force of the coil spring 6 and the tension of the transmission belt exerted on the arm member 5 is lost, and the arm outer cylinder 12 of the arm member 5 moves in a counterclockwise direction in FIG. 9, whereby the balanced state is restored. As this occurs, since the plate spring 19, whose second end portion 19b is made into the free end, is deformed into a slightly diametrically expanded state, a frictional torque exerted between the locking projection 15 of the base member 3 and the arm outer cylinder 12 of the arm member 5 is large. Arrows outlined with thick black solid lines in FIG. 10 show surface contact pressures which are produced between the inner circumferential surface 12a of the arm outer cylinder 12 and the friction members 20 by the diametrically expanded deformation.

In this way, in the automatic tensioner 1 according to the embodiment, a so-called asymmetric damping is realized in which frictional forces (frictional torques) that are generated between the friction members 20 and the arm member 5 are made different between when the arm member 5 rotates in a direction in which the belt becomes taut and when the arm member 5 rotates in a direction in which the belt becomes slack.

As has been described, according to the embodiment, since the circumferential deviation of the friction members 20 relative to the plate spring 19 is prevented by locking the friction members 20 on the plate spring 19 so as not to move relative to the plate spring 19 in the circumferential direction, a reduction in braking force attributed to the deviation can be suppressed.

In addition, since the friction members 20 are pressed against the base member 3 by the self elastic axial force (the repulsive force) with which the coil spring 6 attempts to extend in the axial direction, the placement of the plate spring 19 with respect to the base member 3 becomes stable, whereby eccentric wear of the friction members 20 is suppressed.

Further, since the second end portion 19b of the plate spring 19 is made into the free end and the friction members 20 are provided so as to be brought into contact with the inner circumferential surface 12a of the arm outer cylinder 12 of the arm member 5, the so-called asymmetric damping is realized in which frictional forces that are generated between the friction members 20 and the arm member 5 are made different between when the arm member 5 rotates in the direction in which the belt becomes taut and when the arm member 5 rotates in the direction in which the belt becomes slack.

In addition, the first end portion 19a of the plate spring 19 is held by the base member 3 and the coil spring 6 therebetween in the circumferential direction. Namely, since the coil spring 6 biases the base member 3 in one direction, the first end portion 19a of the plate spring 19 is brought into engagement with the base member 3 in the circumferential direction. According to this configuration, the first end portion 19a of the plate spring 19 can be locked on the base member 3 in an ensured fashion without making the configuration complex.

Thus, while the preferred embodiments of the invention have been described, the embodiments can be carried out by being altered as follows.

For example, the locking of the plate spring 19 and the friction members 20 may be implemented through adhesion by an adhesive or brazing. The locking through such approaches also contributes to the prevention of circumferential deviation of the friction members 20 relative to the plate spring 19.

(Seventh Embodiment)

Figure 11:
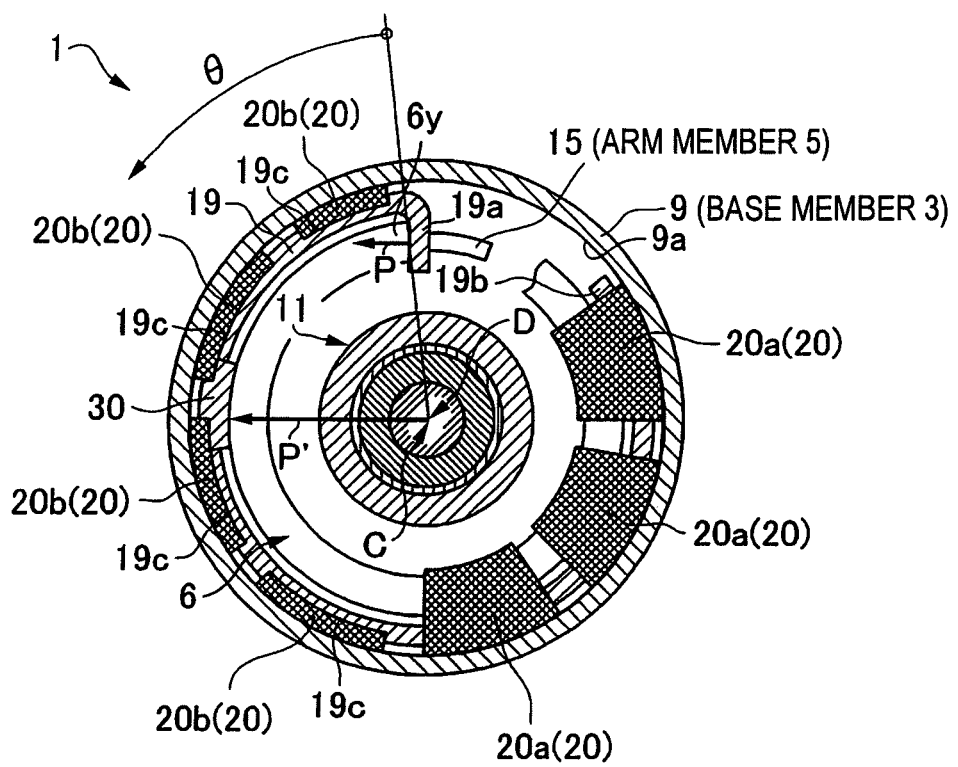
FIG. 11 is a sectional view showing a seventh embodiment of the invention.

Next, referring to FIG. 11, a seventh embodiment of the invention will be described. FIG. 11 is a sectional view showing the seventh embodiment of the invention. Hereinafter, those features in which this embodiment differs from the first embodiment will mainly be described, and those features similar to those of the first embodiment will be omitted as required.

In an automatic tensioner 1 according to the embodiment, in addition to the configuration of the automatic tensioner 1 according to the first embodiment, a coil spring support member 30 is provided between friction members 20 and a coil spring 6 for suppressing the inclination of a posture of the coil spring 6 which lies in proximity to a first end portion 19a of a plate sprig 19. Namely, as viewed in section as shown in FIG. 11, the coil spring support member 30 is in such a relationship with the friction members 20 and the coil spring 6 that the coil spring support member 30 is held in a radial direction by the friction members 20 and the coil spring 6 therebetween. This coil spring support member 30 is made of, for example, a resin and is secured to the friction members 20 by an appropriate adhesion means.

Here, the inclination of the posture of the coil spring 6 will be described. FIG. 11 shows what is happening in the automatic tensioner 1 when a tension of a transmission belt wound around the pulley 4 shown in FIG. 1 changes within a predetermined range.

As is shown in the figure, normally, a spiral axis D of the spiral coil spring 6 accommodated within a base outer cylinder 9 is designed so as to substantially coincide with an axis C of the automatic tensioner 1 which can be specified based on an inner circumferential surface 9a of the base outer cylinder 9. In this state, when an end portion 6y of the coil spring 6 receives a load P from a locking projection 15 of an arm member 5 as is indicated by reference character P in FIG. 11, for example, the coil spring 6 lying in proximity to (generally 180° apart from) the first end portion 19a of the plate spring 19 is inclined to a left-hand side on a sheet of paper on which FIG. 11 is drawn. Then, the posture of the coil spring 6 means a posture of the coil spring 6 which can be observed by comparing the spiral axis D of the coil spring 6 with the axis C of the automatic tensioner 1.

In this embodiment, as is shown in FIG. 11, based on the axis C of the automatic tensioner 1, the coil spring support member 30 is disposed in the same direction P' as the direction of the load P which the end portion 6y of the coil spring 6 receives from the arm member 5. Namely, by using an angle θ [degrees] which is specified in an extending direction of the plate spring 19 based on the end portion 6y of the coil spring 6, the coil spring support member 30 is disposed generally in a position where θ [degrees]=90.

In the configuration described above, when the arm member 5 starts to rotate in a counterclockwise direction, the end portion 6y of the coil spring 6 receives the load P from the locking projection 15 of the arm member 5 via the first end portion 19a of the plate spring 19. The coil spring 6 lying in proximity to the first end portion 19a of the plate spring 19 is inclined towards the left-hand side on the sheet of paper on which FIG. 11 is drawn and is strongly attached closely to the coil spring support member 30. Following this, the coil spring 6 presses the coil spring support member 30 radially outwards, and this pressing force increases a frictional force between the inner circumferential surface 9a of the base outer cylinder 9 and the friction members 20.

When the arm member rotates further counterclockwise, as has been described in the first embodiment, the plate spring 19 in which a second end portion 19b is made into a free end is deformed into a slightly diametrically expanded state, and therefore, a frictional torque exerted between the locking projection 15 of the arm member 5 and the base outer cylinder 9 of the base member 3 becomes large.

To describe this straightforward, compared with the automatic tensioner 1 of the first embodiment, in the automatic tensioner 1 according to this embodiment, the tension of the transmission belt becomes too large, and when the arm member 5 starts to rotate in the counterclockwise direction in FIG. 11, a frictional force is generated between the inner circumferential surface 9a of the base outer cylinder 9 and the friction members 20 extremely quickly.

Thus, as has been described heretofore, in this embodiment, in order to realize the stabilization of the posture of the coil spring 6 lying in proximity to the first end portion 19a of the spring 19, the coil spring support member 30 is placed between the friction members 20 and the coil spring 6. Compared with a case where some means is devised at the first end portion 19a of the plate spring 19 to deal with the inclination of the posture of the coil spring 6, the configuration according to this embodiment is useful from the viewpoints of life and degree of freedom in design in that an exact distribution of roles of the required functions is realized.

In addition, the automatic tensioner 1 may further be configured as below. Namely, the coil spring support member 30 is secured to the friction members 20. According to this configuration, when some load is exerted on the coil spring support member 30 as a result of the coil spring 6 being displaced or deformed, the load is transmitted to the friction members 20 with good efficiency. Consequently, the frictional force between the friction member and the base or the rotary member is increased.

Additionally, the automatic tensioner 1 may further be configured as below. Namely, based on the axis C of the automatic tensioner 1, the coil spring support member 30 is disposed in the same direction P' as the direction of the load P that the end portion 6y of the coil spring 6 receives from the arm member 5. According to this configuration, since the coil spring support member 30 is configured so as to wait for an initial inclination of the posture of the coil spring 6 lying in proximity to the first end portion 19a of the plate spring 19, the inclination of the posture of the coil spring 6 lying in proximity to the first end portion 19a of the plate spring 19 can be suppressed with good efficiency.

In addition, the automatic tensioner 1 may further be configured as below. Namely, the coil spring support member 30 is disposed in a position lying 90° apart from the end portion 6y of the coil spring 6 where the coil spring support member 30 abuts the first end portion 19a of the plate spring 19. According to this configuration, since the coil spring support member 30 is configured so as to wait for an initial inclination of the posture of the coil spring 6 lying in proximity to the first end portion 19a of the plate spring 19, the inclination of the posture of the coil spring 6 lying in proximity to the first end portion 19a of the plate spring 19 can be suppressed with good efficiency.

Note that in the embodiment above, while the coil spring support member 30 is disposed in the position where θ=90°, the invention is not limited thereto, and hence, in the event that the coil spring support member 30 is disposed in a wide range of 70°≤θ≤110°, the above highly efficient suppressing effect can sufficiently be exhibited. However, the coil spring support member 30 is preferably disposed within a range of 80°≤θ≤110°, and the coil spring support member 30 is most preferably disposed generally in the position where θ=90°.

Thus, while the seventh preferred embodiment of the invention has been described, the invention can be carried out by being further altered as below.

(Eighth Embodiment)

In the embodiment, while the coil spring support member 30 and the friction members 20 are separate members at the time of assemblage and are secured to each other when they are assembled together, the coil spring support member 30 and the friction members 20 may be formed integrally.

In the embodiment, while only one coil spring support member 30 is disposed, two or three or more coil spring support members 30 may be disposed. As this occurs, although all the coil spring support members 30 are preferably disposed in the preferred angular range described above, a configuration may be adopted in which only any one of the coil spring support members 30 is disposed within the preferred angular range above, and the other coil spring support members 30 are disposed out of the preferred angular range above.

While the invention has been described in detail and by reference to the specific embodiments, it is obvious to those skilled in the art to which the invention pertains that various alterations and modifications can be made thereto without departing from the spirit and scope of the invention.

This patent application is based on Japanese Patent Application No. 2008-263942 filed on Oct. 10, 2008 and Japanese Patent Application No. 2009-129041 filed on May 28, 2009, the contents of which are incorporated herein by reference.

Industrial Applicability

According to the invention, the automatic tensioner is provided which holds the tension of the belt as required and which suppresses a reduction in braking force.

Description of Reference Numerals

1 Automatic Tensioner;
2 Engine Block;
3 Base Member;
4 Pulley;
5 Arm Member;
6 Coil Spring;
7 Arm;
9 Base Outer Cylinder;
9a Inner Circumferential Surface of Base Outer Cylinder;
15 Locking Projection.

The invention claimed is:

1. An automatic tensioner, comprising:
a base;
a rotary member which is supported rotatably on the base and to which a pulley around which a belt is wound can be attached;
a coil spring including one end locked on the base and an other end locked on the rotary member and adapted to bias the rotary member in one direction with respect to the base;
an elastic element having an arc shape including one end locked with a projection member on one of the rotary member and the base and an other end which is a free end, the other end extending along an inner circumferential surface of the other one of the rotary member and the base; and
a friction members connected so as to be brought into contact with the inner circumferential surface of the other one of the rotary member and the base and so as not to move in a circumferential direction relatively to the elastic element, wherein
the coil spring is disposed in such a state that the coil spring is compressed in an axial direction, and the friction members are pressed against the one of the rotary member and the base by a repulsive force attempting to expand in the axial direction,
wherein the arc shape of the elastic member is disposed along the circumferential direction of the inner circumferential surface of the other one of the rotary member and the base, and the one end is bent radially inwards at 90 degrees from the inner circumferential surface of the other one of the rotary member and the base, and
the friction members are disposed at equal intervals around the elastic member, wherein individual ones of the friction members become gradually thicker as a distance from the one end of the elastic member increases.

2. The automatic tensioner according to claim 1, wherein the one end of the elastic element is held by the one of the rotary member and the base and the coil spring in the circumferential direction.

3. The automatic tensioner according to claim 1, wherein the friction members are provided so as to be spaced apart from each other along an extending direction of the elastic element.

4. The automatic tensioner according to claim 1, wherein Individual ones of the friction members have an L-shaped section, a portion vertical to the axial direction receives the coil spring in the axial direction, and a portion parallel to the axial direction receives the elastic element in a radial direction.

5. The automatic tensioner according to claim 1, wherein the elastic element and the friction member are locked together by meshing engagement of irregularities formed thereon.

6. The automatic tensioner according to claim 1, wherein the elastic element and the friction member are locked together through either adhesion by an adhesive or brazing.

7. The automatic tensioner according to claim 1, wherein:
the friction members are made of a synthetic resin; and the friction members and the elastic element are formed integrally.

8. The automatic tensioner according to claim 1, further comprising
a coil spring support member which suppresses the inclination of a posture of the coil spring in proximity to the one end of the elastic element, wherein
the coil spring support member is disposed between the friction member and the coil spring.

9. The automatic tensioner according to claim 8, wherein the coil spring support member is secured to the friction member.

10. The automatic tensioner according to claim 8, wherein based on an axis of the automatic tensioner, the coil spring support member is disposed in the same direction as a direction of a load that the end portion of the coil spring which abuts the one end of the elastic element receives from one of the rotary member and the base.

11. An automatic tensioner according to claim 8, wherein the coil spring support member is disposed within a range of 70° to 100° from the end portion of the coil spring where the coil spring support member abuts the one end of the elastic member.

* * * * *